United States Patent
Englund

Patent Number: 6,132,103
Date of Patent: Oct. 17, 2000

[54] ROTOR PROVIDED WITH SHAFT PIVOTS

[75] Inventor: Arnold Englund, Spånga, Sweden

[73] Assignee: Lysholm Technologies AB, Stockholm, Sweden

[21] Appl. No.: 09/254,962

[22] PCT Filed: Oct. 9, 1997

[86] PCT No.: PCT/SE97/01687

§ 371 Date: Mar. 22, 1999

§ 102(e) Date: Mar. 22, 1999

[87] PCT Pub. No.: WO98/17914

PCT Pub. Date: Apr. 30, 1998

[30] Foreign Application Priority Data

Oct. 22, 1996 [SE] Sweden .................................. 9603878

[51] Int. Cl.⁷ .................................................. F16C 19/08
[52] U.S. Cl. .......................... 384/585; 384/127; 384/584
[58] Field of Search ................................... 384/127, 537, 384/542, 584, 585

[56] References Cited

U.S. PATENT DOCUMENTS

| | | | |
|---|---|---|---|
| 2,950,944 | 8/1960 | Cooney | 308/236 |
| 3,788,712 | 1/1974 | Kohler et al. | 384/585 X |
| 3,912,347 | 10/1975 | Pflugner et al. | 384/585 X |
| 3,937,035 | 2/1976 | Fisher et al. | 384/585 X |
| 4,456,314 | 6/1984 | Messori et al. | 308/236 |
| 4,487,563 | 12/1984 | Mori et al. | |
| 4,490,102 | 12/1984 | Carré et al. | |
| 4,637,806 | 1/1987 | Olschewski et al. | 384/585 X |
| 4,710,038 | 12/1987 | Hennon et al. | 384/569 |
| 4,913,565 | 4/1990 | Englund | |
| 4,980,587 | 12/1990 | Yonei et al. | 384/585 X |
| 5,106,350 | 4/1992 | Beton | 384/585 X |
| 5,230,275 | 7/1993 | Hodge et al. | 384/585 X |
| 5,259,677 | 11/1993 | Degrange et al. | 384/585 |
| 5,385,413 | 1/1995 | Murphy et al. | 384/585 X |
| 5,501,532 | 3/1996 | Terrill | 384/572 |
| 5,505,547 | 4/1996 | Kodaira | 384/585 X |
| 5,524,988 | 6/1996 | Cheung | |

*Primary Examiner*—Khoi Q. Ta
*Attorney, Agent, or Firm*—Frishauf, Holtz, Goodman, Langer & Chick, P.C.

[57] ABSTRACT

A rotor (2, 3) is provided with bearing trunnions (4, 5). The rotor is made of a material with limited strength properties, such as aluminum. At least one of the bearing trunnions (4) comprises a concentric sleeve (20) made of steel at one end of the rotor. The inner end (21) of the sleeve (20) is radially attached to the rotor end (22) by a trunnion (4) protruding into the sleeve, or by a groove (40) in the rotor end (22), into which groove the inner end (21) of the sleeve protrudes. The outer end of the sleeve (20) is kept by a screw (25, 27) screwed into the rotor (2, 3) and provided with a screw head (24) pressed axially in the direction towards the rotor end (22).

27 Claims, 3 Drawing Sheets

ROTOR PROVIDED WITH SHAFT PIVOTS

BACKGROUND OF THE INVENTION

The present invention relates to rotor provided with bearing trunnions, which rotor is made of lightweight material having limited strength properties.

When rotors are made of a material with limited strength properties in comparison to steel, some problems are involved in the provision of the bearing trunnions. If the bearing trunnions are made of the same material as the rotors and integrated with the rotors, e.g. of aluminum, magnesium, plastics or ceramic material, the bearing trunnions will get an unpractically large diameter and so also the bearings. This disadvantage is particularly obvious at journalling of the low pressure ends of the rotors in screw compressors provided with axial inlet ports, the design of which is restricted by bearing trunnions and bearings having a large diameter. The provision of axially positioned screws for reinforcing the bearing trunnions has been tested, but this has not been sufficient for avoiding harmful flexural stresses to the bearing trunnions. Steel shafts passing through especially plastic rotors have been used, resulting in sufficient bending strength, but at the same time resulting in an increased rotor weight where low weight is desired.

The object of the present invention is to achieve in a simple way rotors having bearing trunnions which have a comparatively small diameter but at the same time a great strength property, especially bending strength.

SUMMARY OF THE INVENTION

According to the present invention, a rotor is provided with a plurality of bearing trunnions (4,5). The rotor is made of a lightweight material having limited strength properties. At least one (4) of the trunnions (4, 5) comprises a concentric sleeve (20) located at one end of the rotor. The sleeve (20) has an inner end (21) which is radially fixed by a guide (4,40) at the one end (22) of the rotor, and the sleeve (20) has an outer end positioned by a clamping surface (23) acted upon by a head (24) of a screw (25) that extends into a threaded boring (28) in the one end of the rotor. the head (24) of the screw bears axially against the outer end of the sleeve (20) and keeps the sleeve (20) pressed against the one end (22) of the rotor.

According to a preferred embodiment of the invention, the sleeve comprises an inner race of a radial bearing (30).

According to another embodiment of the invention, the guide comprises a hollow trunnion (4) protruding from the one end of the rotor, and the hollow trunnion has essentially the same outer diameter as the inner diameter of the sleeve (20).

According to an alternative embodiment of the invention, the guide comprises an annular groove (40) in the one end of the rotor, into which groove (40) the inner end portion (21) of the sleeve protrudes.

According to another feature of the invention, the screw head (24) has an underside which is provided with an alignment spacer (29) which protrudes into the outer end of the sleeve (20). The spacer preferably has an outer diameter which is substantially the same as the inner diameter of the outer end of the sleeve for close engagement with the sleeve and for centering the sleeve. The spacer (29) faces the clamping surface (23) on the underside of the screw head (24).

BRIEF DESCRIPTION OF THE DRAWINGS

The invention is described in further detail below with reference to the appended drawings, which show various embodiments of rotors according to the invention.

DETAILED DESCRIPTION

Figure 1:
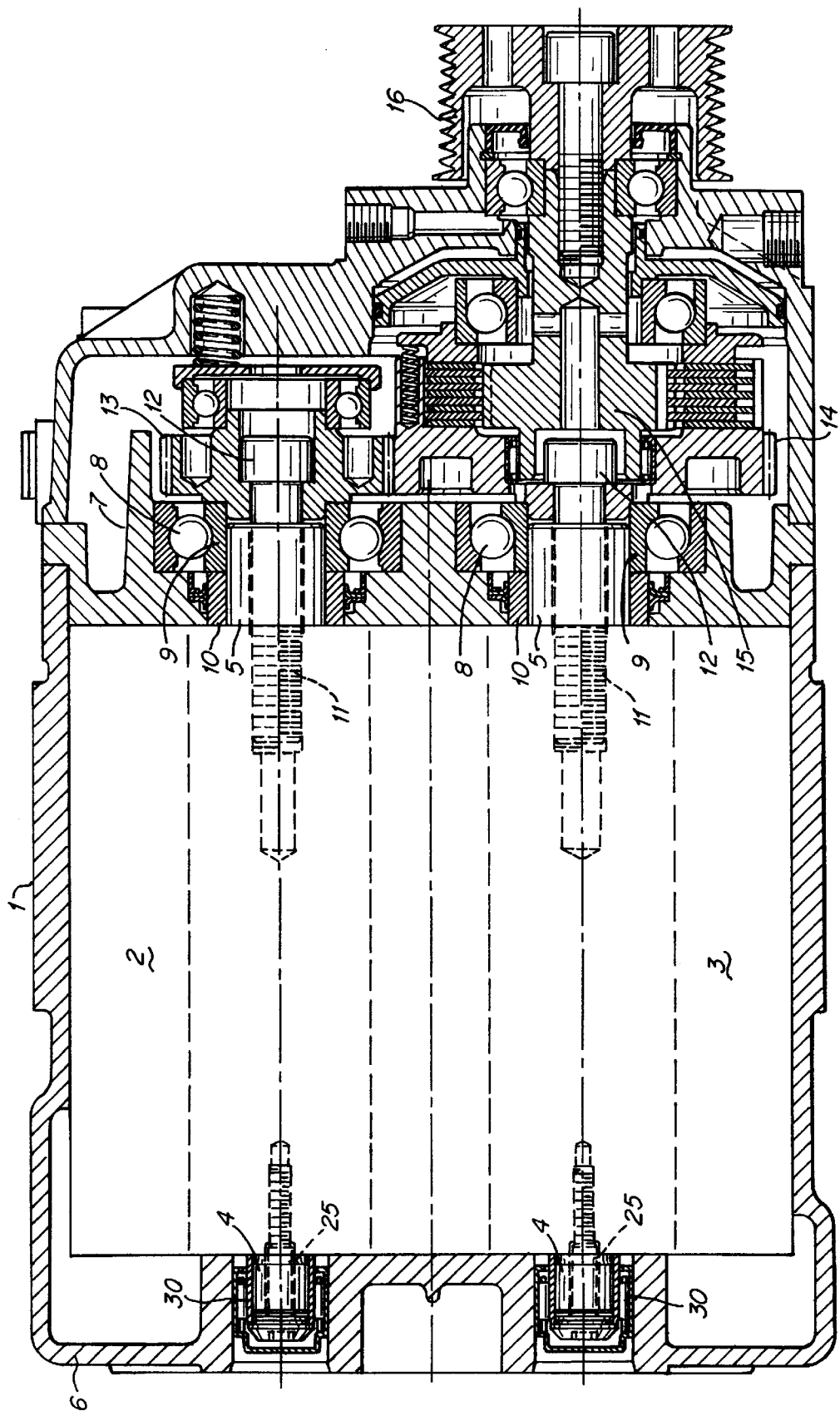
FIG. 1 is a side view of a screw compressor with a housing, bearings and clutch, shown in section.

FIG. 1 shows a screw compressor with a housing 1, in which a male rotor 2 and a female rotor 3 are journalled with bearing trunnions 4 and 5, respectively, in a low pressure end wall 6 and a high pressure end wall 7.

Each bearing trunnion 5 is journalled in a combined thrust and radial bearing 8 whose inner race 9 together with a spacer sleeve 10 abut the bearing trunnion 5 and are kept pressed against the corresponding rotor end by a screw 11 screwed into the corresponding rotor 2,3 and having a head 12 that is pressing a synchronizing gear 13 and 14, respectively, against the inner races 9 of the bearings 8. The female rotor 3 and its synchronizing gear 14 are via a disc clutch 15 driven by a belt pulley 16 connected to the clutch.

Figure 2:
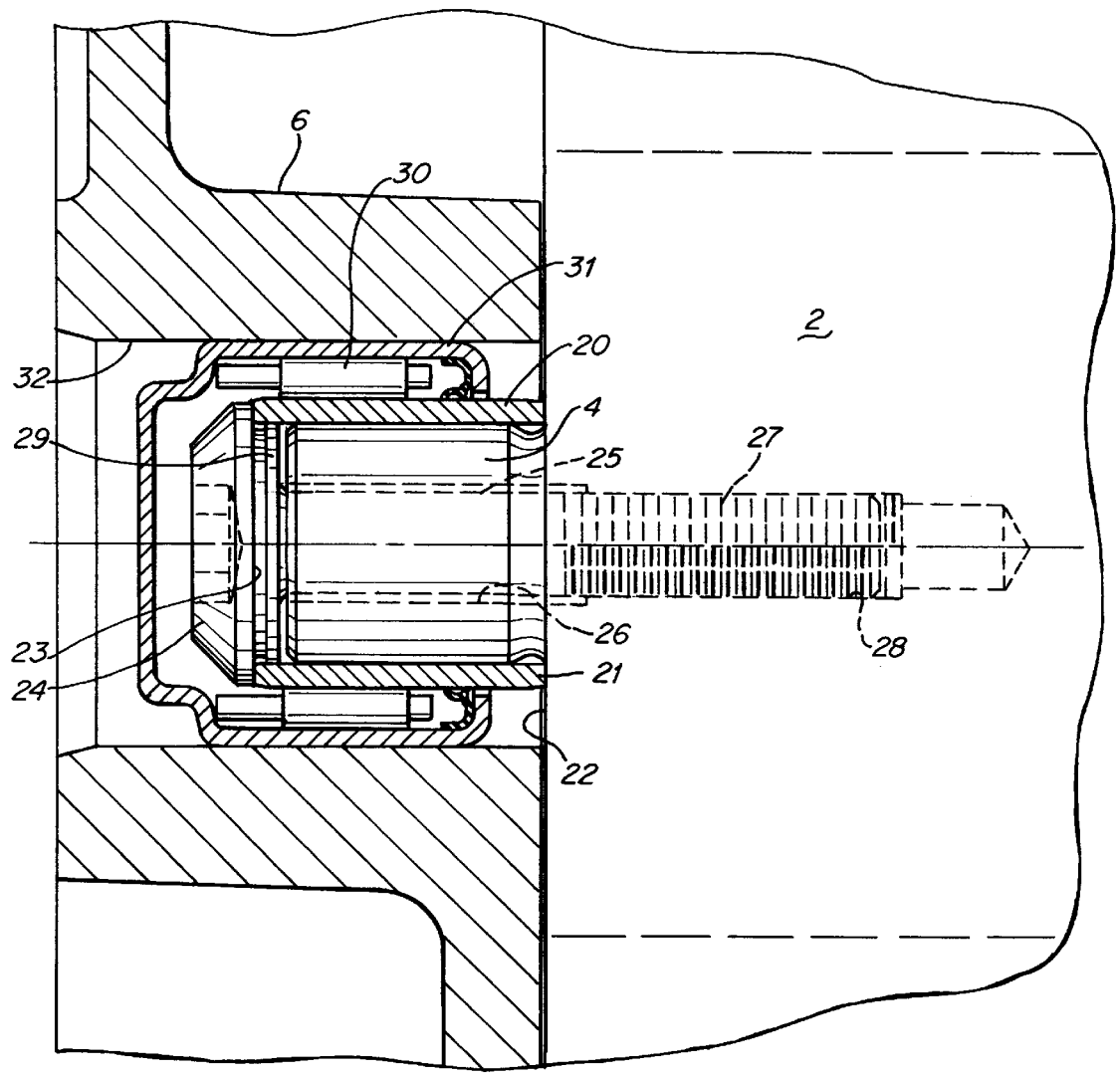
FIG. 2 is a detail of FIG. 1 shown on a larger scale.

The journalling of the bearing trunnions 4 in the end wall 6 is shown most clearly in FIG. 2. The bearing trunnion 4 is with close running fit enclosed by a steel sleeve 20, the inner end of which abuts the end surface 22 of the rotor 2 fixed in the radial direction by the bearing trunnion 4.

The outer end of the sleeve 20 protrudes beyond the end of the bearing trunnion 4 and abuts an annular, plane surface 23 of a head 24 of a screw 25 that extends through an axial boring 26 in the bearing trunnion 4 and with a threaded part 27 extends into a threaded boring 28. The head 24 of the screw is provided with a circular spacer 29 that extends into the outer end of the sleeve 20 for centering purposes.

The sleeve 20 comprises of the inner race of a radial bearing 30 having an outer race 31 abutting a cylindrical wall 32 in a cavity in the end wall 6.

By the radial positioning of the sleeve 20 at the rotor end 22 by the inner part of the bearing trunnion 4 and the pressure of the screw head 24 against the outer end of the sleeve 20 and the centering of this by the circular spacer 29, shear stresses as well as flexural stresses acting on this part of the journalling of the rotor will be carried by the sleeve 20 and the axial pressure of the screw 25 against the sleeve 20. The diameter of the sleeve 20 accordingly can be essentially smaller than the diameter of a bearing trunnion made of e.g. aluminum.

The bearing trunnion 4 in the sleeve 20 shown in FIG. 2 is intended only for radial positioning of the inner end of the sleeve 20 with respect to the end of the rotor.

Therefore, the bearing trunnion 4 can be made much shorten, which involves an essential material saving at the manufacturing of the rotor. It is even possible to completely spare the bearing trunnion if a positioning of the inner end 21 of the sleeve 20 can be achieved in another way.

Figure 3:
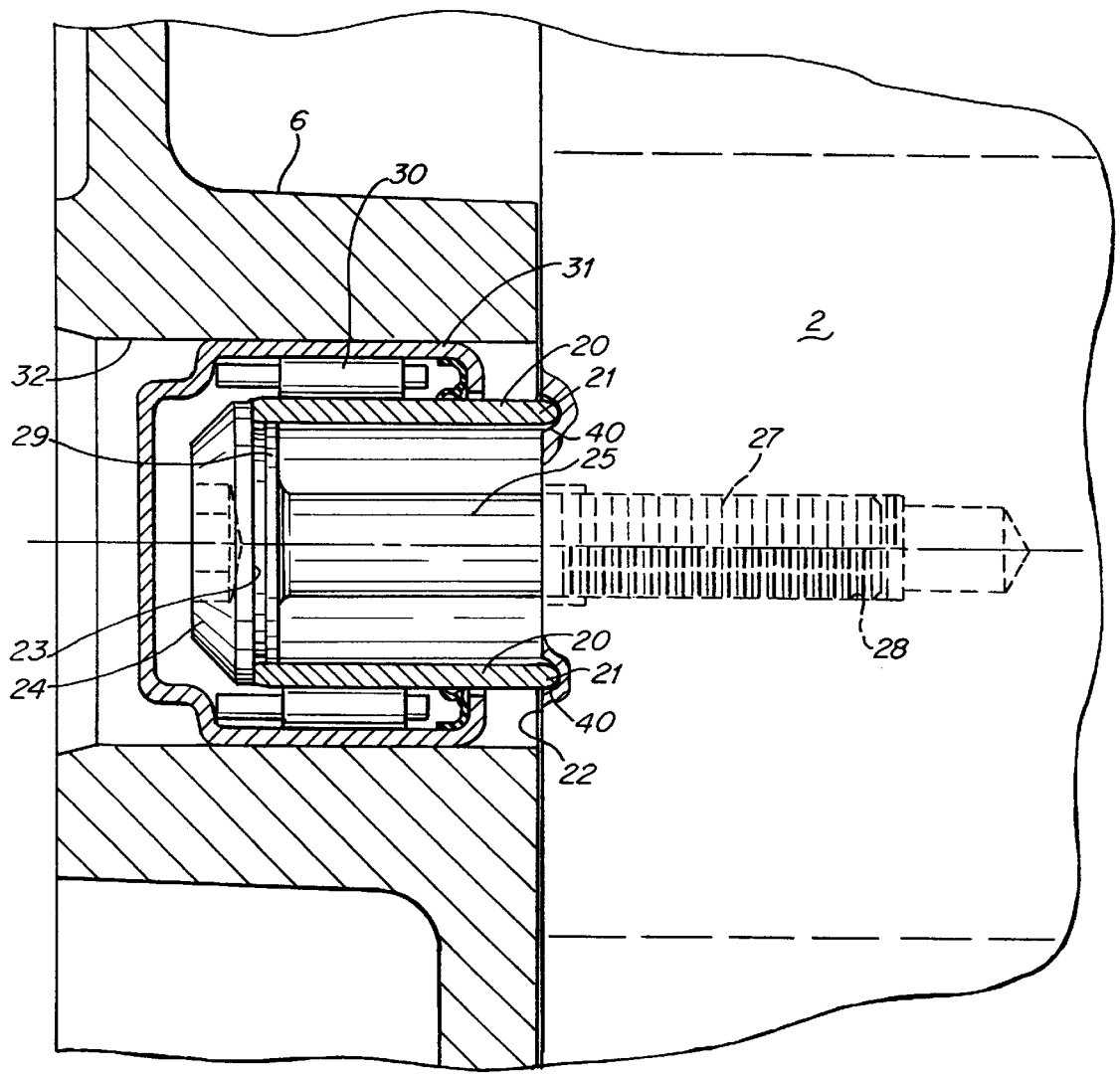
FIG. 3 is a modification of the embodiment shown in FIG. 2.

Such an embodiment is shown in FIG. 3, which differs from the embodiment in FIG. 2 in that the bearing trunnion 4 is eliminated and replaced by an annular groove 40 in the end surface 22 of the rotor 2, in which groove the inner end 21 of the sleeve 20 is situated and radially fixed.

The journalling of the bearing trunnion 5 in FIG. 1 is carried out essentially in the same way as the journalling of the bearing trunnion 4 in FIGS. 1 and 2. Instead of a sleeve 20 made in one piece and enclosing the bearing trunnion 4, the bearing trunnion 5 is positioned partly in the sleeve 10, and partly in the inner race 9 of the bearing 8. At axial compression of these by the screw 11, the sleeve 10 and the inner race 9 will work like a single sleeve corresponding to the sleeve 20 of the bearing trunnion 4.

What is claimed is:

1. A rotor provided with a plurality of bearing trunnions (4,5), wherein:

said rotor is made of a lightweight material having limited strength properties, at least one (4) of the trunnions (4, 5) comprises a concentric sleeve (20) located at one end of the rotor, the sleeve (20) having an inner end (21) which is radially fixed by a guide (4,40) at the one end (22) of the rotor and the sleeve (20) having an outer end positioned by a clamping surface (23) acted upon by a head (24) of a screw (25) that extends into a threaded boring (28) in said one end of the rotor, and wherein the head (24) of the screw bears axially against the outer end of the sleeve (20) and keeps the sleeve (20) pressed against said one end (22) of the rotor.

2. A rotor according to claim 1, wherein said lightweight material is a lightweight metal.

3. A rotor according to claim 1, wherein said concentric sleeve (20) is made of steel.

4. A rotor according to claim 1, wherein said concentric sleeve (20) is made of a material which is stronger than said lightweight material of said rotor.

5. A rotor according to claim 1, wherein the sleeve (20) comprises an inner race of a radial bearing (30).

6. A rotor according to claim 5, wherein the guide comprises a hollow trunnion (4) protruding from said one end of the rotor, and wherein said hollow trunnion (4) has essentially the same outer diameter as the inner diameter of the sleeve (20).

7. A rotor according to claim 6, wherein the sleeve (20) comprises an inner race of a radial bearing (30).

8. A rotor according to claim 7, wherein the guide comprises a hollow trunnion (4) protruding from said one end of the rotor, and wherein said hollow trunnion (4) has essentially the same outer diameter as the inner diameter of the sleeve (20).

9. A rotor according to claim 1, wherein the guide comprises a hollow trunnion (4) protruding from said one end of the rotor, and wherein said hollow trunnion (4) has essentially the same outer diameter as the inner diameter of the sleeve (20).

10. A rotor according to claim 3, wherein the guide comprises a hollow trunnion (4) protruding from said one end of the rotor, and wherein said hollow trunnion (4) has essentially the same outer diameter as the inner diameter of the sleeve (20).

11. A rotor according to claim 4, wherein the guide comprises a hollow trunnion (4) protruding from said one end of the rotor, and wherein said hollow trunnion (4) has essentially the same outer diameter as the inner diameter of the sleeve (20).

12. A rotor according to claim 1, wherein the guide comprises an annular groove (40) in said one end of the rotor, into which groove the inner end portion (21) of the sleeve protrudes.

13. A rotor according to claim 2, wherein the guide comprises an annular groove (40) in said one end of the rotor, into which groove the inner end portion (21) of the sleeve protrudes.

14. A rotor according to claim 4, wherein the guide comprises an annular groove (40) in said one end of the rotor, into which groove the inner end portion (21) of the sleeve protrudes.

15. A rotor according to claim 1, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

16. A rotor according to claim 2, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

17. A rotor according to claim 4, wherein said screw head (24) has an under side which is provided with an alignment spacer (29) which with close alignment protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

18. A rotor according to claim 5, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

19. A rotor according to claim 6, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

20. A rotor according to claim 7, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

21. A rotor according to claim 8, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

22. A rotor according to claim 9, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

23. A rotor according to claim 10, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

24. A rotor according to claim 11, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

25. A rotor according to claim 12, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

26. A rotor according to claim 13, wherein said screw head (24) has an under side which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under side of said screw head (24).

27. A rotor according to claim 14, wherein said screw head (24) has an under aide which is provided with an alignment spacer (29) which protrudes into the outer end of the sleeve (20), the spacer (29) having an outer diameter which is substantially the same as the inner diameter of the outer end of the sleeve for centering the sleeve, and said spacer (29) facing said clamping surface (23) on the under aide of said screw head (24).

* * * * *

UNITED STATES PATENT AND TRADEMARK OFFICE
CERTIFICATE OF CORRECTION

PATENT NO. : 6,132,103
DATED : October 17, 2000
INVENTOR(S) : Arnold Englund

Page 1 of 1

It is certified that error appears in the above-identified patent and that said Letters Patent is hereby corrected as shown below:

<u>Column 6,</u>
Lines 10 and 16, change "aide" to -- side --.

Signed and Sealed this

Sixteenth Day of April, 2002

Attest:

JAMES E. ROGAN
*Director of the United States Patent and Trademark Office*

*Attesting Officer*